United States Patent [19]

Fujitani et al.

[11] Patent Number: 4,907,473
[45] Date of Patent: Mar. 13, 1990

[54] DIFFERENTIAL MECHANISM OF A FOUR-WHEEL DRIVING APPARATUS FOR VEHICLES

[75] Inventors: Yuuki Fujitani, Toyota; Kouji Kawakami, Chiryu, both of Japan

[73] Assignee: Aisin Seiki Kabushiki Kaisha, Kariya, Japan

[21] Appl. No.: 251,763

[22] Filed: Sep. 30, 1988

[30] Foreign Application Priority Data

Sep. 30, 1987 [JP] Japan ................. 62-246279

[51] Int. Cl.$^4$ ................. F16H 1/44; F16H 37/06; B60K 17/352
[52] U.S. Cl. ................. 475/250; 180/250; 475/204; 475/252
[58] Field of Search ............ 74/710.5, 705, 674, 74/701; 180/249, 250

[56] References Cited

U.S. PATENT DOCUMENTS

| | | | |
|---|---|---|---|
| 3,895,546 | 7/1975 | Yamaguchi et al. | 74/710.5 |
| 3,908,775 | 9/1975 | Van Fossen | 180/250 |
| 4,074,591 | 2/1978 | Dick | 74/710.5 |
| 4,788,888 | 12/1988 | Tsutsumikoshi | 74/710.5 |
| 4,804,061 | 2/1989 | Kameda | 180/250 X |

FOREIGN PATENT DOCUMENTS

| | | | |
|---|---|---|---|
| 60-69762 | 5/1985 | Japan . | |
| 0034233 | 2/1988 | Japan | 180/249 |
| 0038036 | 2/1988 | Japan | 180/249 |

Primary Examiner—Leslie A. Braun
Assistant Examiner—Harold F. Macris
Attorney, Agent, or Firm—Burns, Doane, Swecker & Mathis

[57] ABSTRACT

A differential mechanism of a four-wheel driving apparatus for vehicles has a planetary gear and transmits the driving torque from an input shaft to a front wheel driving shaft and a rear wheel driving shaft in a distributing manner. The differential mechanism includes a first spline rotated by the driving torque from the input shaft, a second spline connected so as to the integrally rotated with a sun gear of the differential planteary gear, a third spline connected so as to be integrally rotated with a carrier, fourth spline formed on an outer circumferential surface of the ring gear, and a differential change sleeve mounted in an outward radial direction from the first spline to the fourth spline for axially sliding between two positions, one position for connecting first and fourth splines, and the other position for connecting first, second and third splines.

3 Claims, 2 Drawing Sheets

DIFFERENTIAL MECHANISM OF A FOUR-WHEEL DRIVING APPARATUS FOR VEHICLES

BACKGROUND OF THE INVENTION

1. Field of the Invention

This invention relates to a differential mechanism of a four-wheel driving apparatus for vehicles, and more particularly to a differential mechanism of a four-wheel driving apparatus for vehicles having a free range and a lock range.

2. Description of the Prior Art

FIG. 5 shows a conventional differential mechanism of a four-wheel driving apparatus for vehicles. In FIG. 5, an input torque is transmitted from an input shaft 1 to a carrier 2 and transferred from a pinion gear 3 to a ring gear 4 and a sun gear 5 and is transmitted to a front wheel output shaft 6 via the ring gear 4 and a rear wheel output shaft 7 via the sun gear 5. A gear 9 is integrally rotatable with the front wheel output shaft 6 and a gear 10 is integrally rotatable with the rear wheel output shaft 7. The gears 9 and 10 are operatively connected by sliding a sleeve 8 mounted on a rear side of the differential planetary gear into one direction so that the front wheel output shaft 6 and the rear wheel output shaft 7 are connected or locked with each other.

Japanese Utility Model Laid Open Letter No. 60 (1985)-69726 is an example of a conventional differential mechanism of a four-wheel driving apparatus for vehicles. Therein, the ring gear 4 and the sun gear 5 are in a locked or connected state along the teeth surface in the four-wheel driving apparatus and torque transmission is always transmitted between each gear. Therefore, durability and strength of the gears has to be maintained during low range operation of the four-wheel drive due to large torque transmission. As a result, each gear is required to be large in size and heavy in weight. Further, the sleeve 8 is located at a rearward position of the differential planetary for changing between the two ranges of lock for four-wheel drive so that the differential mechanism becomes axially longer in order to accommodate the length of the sleeve 8. As a result, it has been extremely difficult to minimize the size of the differential mechanism.

Furthermore, as the differential planetary gear was a single pinion type, the torque distribution to the front wheel output shaft 6 and the rear wheel output shaft 7, i.e., the torque distribution to the ring gear 4 and the sun gear 5 was unbalanced in a ratio of about 7:3.

SUMMARY OF THE INVENTION

An object of the present invention is to provide a differential mechanism of a four-wheel driving apparatus for vehicles which can avoid the aforementioned drawbacks of large size and large weight.

In accordance with the present invention, a differential mechanism of a four-wheel driving apparatus for vehicles is provided with a planetary gear and transmits the driving torque from an input shaft to a front wheel driving shaft and a rear wheel driving shaft in a distributing manner. The differential mechanism according to the present invention includes a first spline rotated by the driving torque from the input shaft, a second spline connected so as to be integrally rotated with a sun gear of the differential planetary gear, a third spline connected so as to be integrally rotated with a carrier, a fourth spline formed on an outer circumferential surface of the ring gear and a differential change sleeve mounted on an outward portion of the radial direction from the first spline to the fourth spline for axially sliding between two positions. The first position integrally connecting the first and fourth splines and second position for integrally connecting the first, second and third splines.

BRIEF DESCRIPTION OF DRAWINGS

Other objects of features and advantages of the present invention will be understood more clearly and fully from the detailed description of preferred embodiment with reference to the attached drawing.

DETAILED DESCRIPTION OF PREFERRED EMBODIMENTS

Figure 1:
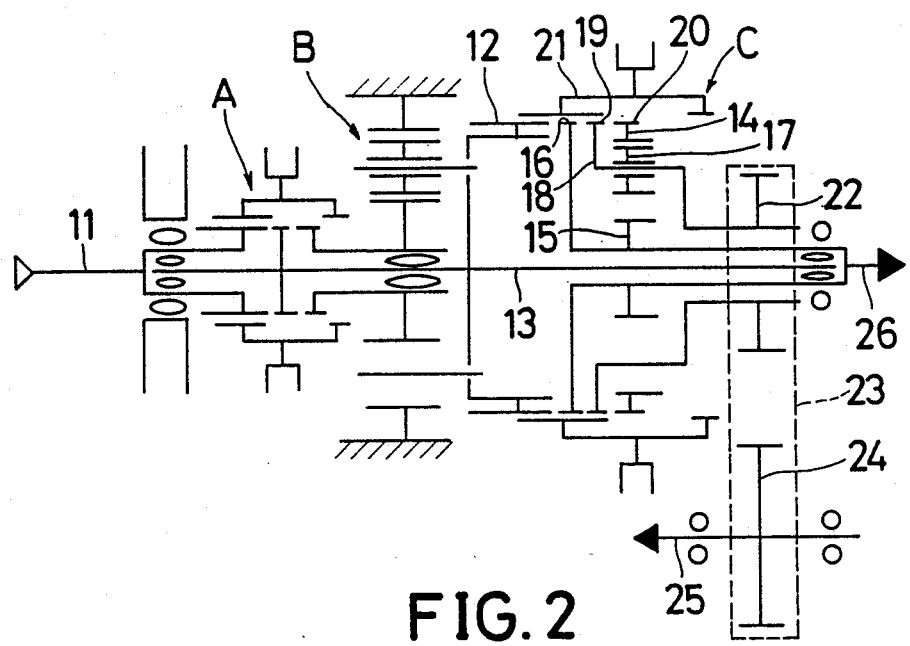
FIG. 1 a schematic showing of an embodiment according to the present invention.

Referring now to FIG. 1, the driving torque transmitted from an input shaft 11 as an input is transmitted to a differential mechanism C via a speed change mechanism A and a speed change mechanism B.

Figure 2:
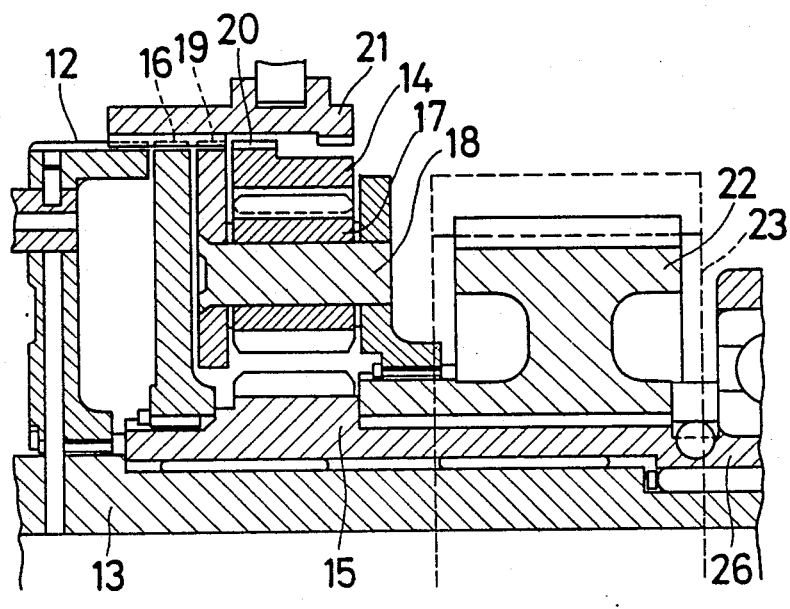
FIG. 2 a lateral sectional view showing a portion of the present invention.

As shown in FIG. 2, the differential mechanism C is provided with a main shaft spline (first spline) 12 having the same outer diameter surface as a ring gear 14. The first spline 12 is connected to the speed change mechanism B and the driving torque from the speed change mechanism B is transmitted thereto.

A second spline 16, adjacent to the first spline 12, is connected to a sun gear 15 so as to be integrally rotated therewith and is provided with the same outer diameter surface as the first spline 12. A third spline 19 is connected to a carrier 18 of a double pinion planetary gear 17 so as to be integrally rotated therewith and is provided with the same outer diameter surface as the second spline 16 adjacent to the first spline 12.

A ring gear 14 is located adjacent to the third spline 19 and a fourth spline 20 is formed on an outer circumferential portion of the ring gear 14 adjacent to the third spline 19. The fourth spline 20 is located on the same outer diameter surface as each of the first to third splines.

A differential change sleeve 21 is axially slidably located in a radial outward direction of the first to fourth splines 12, 16, 19, 20, for selectively connecting the splines.

The carrier 18 of the double pinion planetary gear 17 is connected to a driving sprocket 22 and transmits the driving torque from the driving sprocket 22 to a front wheel output shaft 25 through a chain 23 and a driven sprocket 24. The sun gear 15 is connected to a rear wheel output shaft 26 so as to be integrally rotated therewith.

Figure 3:
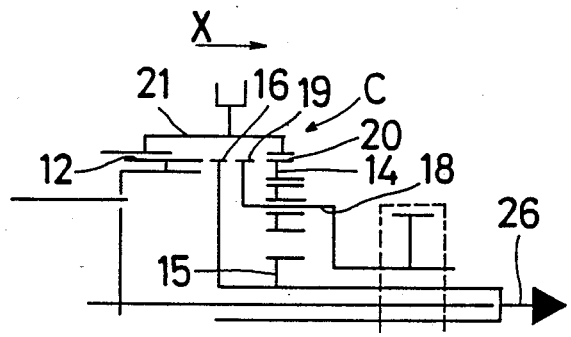
FIG. 3 view similar to FIG. 1 showing a free range or unlocked state of the present invention.

FIG. 3 shows a free range state of the differential mechanism C. In this state, the first and fourth splines 12, 20 are connected so as to be integrally rotated with each other by the connection through the differential change sleeve 21, and second and third splines 16, 18 are a free or non-engaged state. The driving torque transmitted from the speed change mechanism B to a the first spline 12 is transmitted from the differential change sleeve 21 to the ring gear 14 through the fourth spline 20 and is distributed to the carrier 18 and the sun gear 15, namely, front wheel driving shaft 25 and rear wheel driving shaft 26 as an output by the actuation of the differential planetary gear. At this time, the differential planetary gear is a double pinion type, so that the distribution ratio of the driving torque between the front wheel driving shaft 25 and the rear wheel driving shaft 26 can be set as about 1:1.

Figure 4:
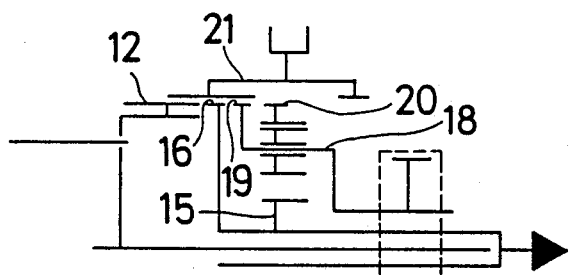
FIG. 4 a view similar to FIG. 1 showing a locked range or connected state of the present invention.
Figure 5:
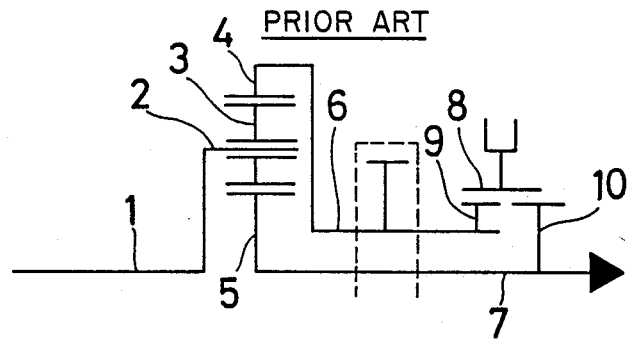
FIG. 5 a view similar to FIG. 1 showing a conventional apparatus.

FIG. 4 shows a lock range state of the differential mechanism C. The differential change sleeve 21 is moved from the free range state of FIG. 3 to an output side (arrow X direction in FIG. 3). In this condition, first, second, and third splines 12, 16, 19 are connected with each other so as to be integrally rotated and the fourth spline 20 is a free or non-connected state. The carrier 18 and the sun gear 15 are locked by the connection of the second spline 16 and the third spline 19 and the driving torque is directly transmitted from the first spline 12 to the front wheel driving shaft 25 and the rear wheel driving shaft 26 through the carrier 18 and the sun gear 15.

According to the present invention, the differential change sleeve 21 is located at an outer portion in the radial direction of the differential planetary gear, so that the axial length of the differential mechanism can be shortened compared with a conventional mechanism and the overall length of the apparatus can be minimized. Further, the lock operation of the differential planetary gear is performed at the spline connected to each carrier and sun gear and the driving torque is directly transmitted to each output shaft without being required to pass through or along the teeth surface of the differential planetary gear. Accordingly, the rotational force is not transmitted along the tooth surface of the planetary gear during the lock states of the differential mechanism in the speed reduction range which increases the rotational torque in low range operation, for example, in the four-wheel driving apparatus having a speed change mechanism operable in low range. As a result, the mechanism will be strong enough to endure high speed range operation and will permit high speed range operation in which a small rotational force is transmitted to each gear of the planetary gear and the mechanism will be minimized in size and weight.

The principles, preferred embodiments and modes of operation of the present invention have been described in the foregoing application. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. A differential mechanism of a four-wheel driving apparatus for vehicles having a planetary gear and transmitting driving torque from an input shaft to a front wheel driving shaft and a rear wheel driving shaft in a distributing manner, comprising:
   a first spline rotated by the driving torque from said input shaft,
   a second spline connected so as to be integrally rotatable with a sun gear of said differential planetary gear,
   a third spline connected so as to be integrally rotatable with a carrier,
   a fourth spline provided on an outer circumferential surface of a ring gear, and
   a differential change sleeve mounted in a radially outward direction from each of said first, second, third and fourth splines for axially sliding movement between two positions, said first and fourth splines positively connected with each other at a first position of said change sleeve and said first, second and third splines positively connected with each other at a second position of said change sleeve.

2. A differential mechanism of a four-wheel driving apparatus for vehicles as set forth in claim 1, wherein said differential planetary gear is a double pinion type.

3. A differential mechanism of a four-wheel driving apparatus as set forth in claim 1, wherein said differential change sleeve is a one-piece sleeve.

* * * * *